(12) United States Patent
Li et al.

(10) Patent No.: US 11,914,269 B2
(45) Date of Patent: Feb. 27, 2024

(54) LASER PROCESSING SYSTEM (71) Applicant: INDUSTRIAL TECHNOLOGY RESEARCH INSTITUTE, Hsinchu (TW)

(72) Inventors: Zih-Yi Li, Tainan (TW); Ying-Tso Lin, Hualien (TW); Shang-Yu Hsu, Tainan (TW); Ying-Hui Yang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 547 days.

(21) Appl. No.: 17/094,734

(22) Filed: Nov. 10, 2020

(65) Prior Publication Data
US 2022/0082900 A1    Mar. 17, 2022

(30) Foreign Application Priority Data
Sep. 11, 2020 (TW) .................................. 109131253

(51) Int. Cl.
*G02F 1/37* (2006.01)
*G02B 27/10* (2006.01)
(Continued)

(52) U.S. Cl.
CPC .............. *G02F 1/37* (2013.01); *B23K 26/067* (2013.01); *B23K 26/0626* (2013.01);
(Continued)

(58) Field of Classification Search
CPC ..... G02F 1/37; G02B 27/1006; G02B 27/106; B23K 26/0626; B23K 26/067
See application file for complete search history.

(56) References Cited

U.S. PATENT DOCUMENTS 6,498,801 B1 * 12/2002 Dudelzak ................ G02F 1/353
372/22
7,006,287 B2    2/2006 Chen
(Continued)

FOREIGN PATENT DOCUMENTS

CN    102380709       3/2012
CN    102689092 A     9/2012
(Continued)

OTHER PUBLICATIONS

Akulov et al., "Fiber lasers with a tunable green output" Nov. 2008.
(Continued)

*Primary Examiner* — Daniel Petkovsek
(74) *Attorney, Agent, or Firm* — Maschoff Brennan (57) ABSTRACT

A laser processing system includes a laser source, an optical splitting unit, a frequency conversion unit and at least one optical mixer. The optical splitting unit is provided to divide light emitted by the laser source into a first light and a second light, and the first light and the second light have the same wavelength range. The frequency conversion unit is provided to convert the second light into a working light. The working light includes a frequency converted light, and the frequency converted light and the second light have different wavelength ranges. The optical mixer is provided to mix the first light with the frequency converted light.

14 Claims, 4 Drawing Sheets

(51) Int. Cl.
   *G02B 27/14* (2006.01)
   *B23K 26/06* (2014.01)
   *B23K 26/067* (2006.01)
   *G02B 27/28* (2006.01)
(52) U.S. Cl.
   CPC ....... *G02B 27/106* (2013.01); *G02B 27/1006* (2013.01); *G02B 27/144* (2013.01); *G02B 27/281* (2013.01)

(56) References Cited

U.S. PATENT DOCUMENTS

| | | | |
|---|---|---|---|
| 7,471,705 B2 * | 12/2008 | Gerstenberger | G02F 1/3534 372/21 |
| 10,175,555 B2 * | 1/2019 | Chuang | G02F 1/3501 |
| 10,556,293 B2 | 2/2020 | Fukumitsu | |
| 2002/0114553 A1 * | 8/2002 | Mead | G02B 6/02133 385/10 |
| 2012/0013699 A1 | 1/2012 | Ueta | |
| 2013/0075377 A1 | 3/2013 | Cheng | |
| 2020/0070280 A1 | 3/2020 | Gauch et al. | |

FOREIGN PATENT DOCUMENTS

| | | | |
|---|---|---|---|
| CN | 102837125 | 12/2012 | |
| CN | 101293307 B | 6/2013 | |
| CN | 102470484 B | 9/2015 | |
| CN | 108555438 | 9/2018 | |
| JP | 4111076 B2 | 7/2008 | |
| TW | I470887 | 1/2015 | |
| TW | I476063 B | 3/2015 | |
| TW | I571341 | 2/2017 | |
| WO | WO-0120397 A1 * | 3/2001 | ............... G02F 1/37 |

OTHER PUBLICATIONS

Hojoong et al., "Green, red, and IR frequency comb line generation from single IR pump in AIN microring resonator" Dec. 2014.
Kumar et al., High-power, single-frequency, continuous-wave second-harmonic-generation of ytterbium fiber laser in PPKTP and MgO:sP-PLT Aug. 2009.
Ruettimann et al., "Reproducible copper welding Combining IR and green light is key" 2014.
Office Action in Taiwan Application No. 109131253 dated Jan. 18, 2021.

* cited by examiner

LASER PROCESSING SYSTEM

CROSS-REFERENCE TO RELATED APPLICATIONS

This non-provisional application claims priority under 35 U.S.C. § 119(a) on Patent Application No(s). 109131253 filed in Taiwan R.O.C on Sep. 11, 2020, the entire contents of which are hereby incorporated by reference.

BACKGROUND

1. Technical Field

This present disclosure relates to a laser processing system.

2. Related Art

LAMC (Laser assisted machining cutting) has been widely used in cutting process as well as laser drilling (TGV). A laser beam is used to strike a target (such as a glass plate, a metal plate, a circuit board, or a semiconductor wafer) to destroy its internal structure or to convert the target from a solid state to a liquid state.

Due to different materials or phase states, various objects have different energy absorption efficiency for specific light wavelength. At present, a conventional laser processing system may use white laser source or monochromatic laser source to strike the object, and such configuration restricts the object applicable to the laser processing system.

Also, the conventional laser processing system is difficult to maintain required efficiency during the processing. In detail, at the beginning of laser processing, solid object may have higher energy absorption efficiency for laser light. However, after a period of the laser processing, the object is at liquid state by the laser, and at this time, the energy absorption rate of the object to the laser light may decline, which is not conducive to the improvement of laser processing accuracy and processing speed.

SUMMARY

According to one aspect of the present disclosure, a laser processing system includes a laser source, an optical splitting unit, a frequency conversion unit and at least one optical mixer. The optical splitting unit is provided to divide light emitted by the laser source into a first light and a second light, and the first light and the second light have the same wavelength range. The frequency conversion unit is provided to convert the second light into a working light. The working light includes a frequency converted light, and the frequency converted light and the second light have different wavelength ranges. The optical mixer is provided to mix the first light with the frequency converted light.

According to another aspect of the present disclosure, a laser processing system includes a laser source, an optical splitting unit, a frequency conversion unit, a first light intensity adjustment unit and a second light intensity adjustment unit. The optical splitting unit is provided to divide light emitted by the laser source into a first light and a second light, and the first light and the second light have the same wavelength range. The frequency conversion unit is provided to convert the second light into a working light. The working light includes a frequency converted light, and the frequency converted light and the second light have different wavelength ranges. The first light intensity adjustment unit is provided to adjust light intensity of the first light, and the optical splitting unit is disposed between the laser source and the first light intensity adjustment unit. The second light intensity adjustment unit is disposed between the optical splitting unit and the frequency conversion unit, and the second light intensity adjustment unit is provided to adjust light intensity of the second light.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
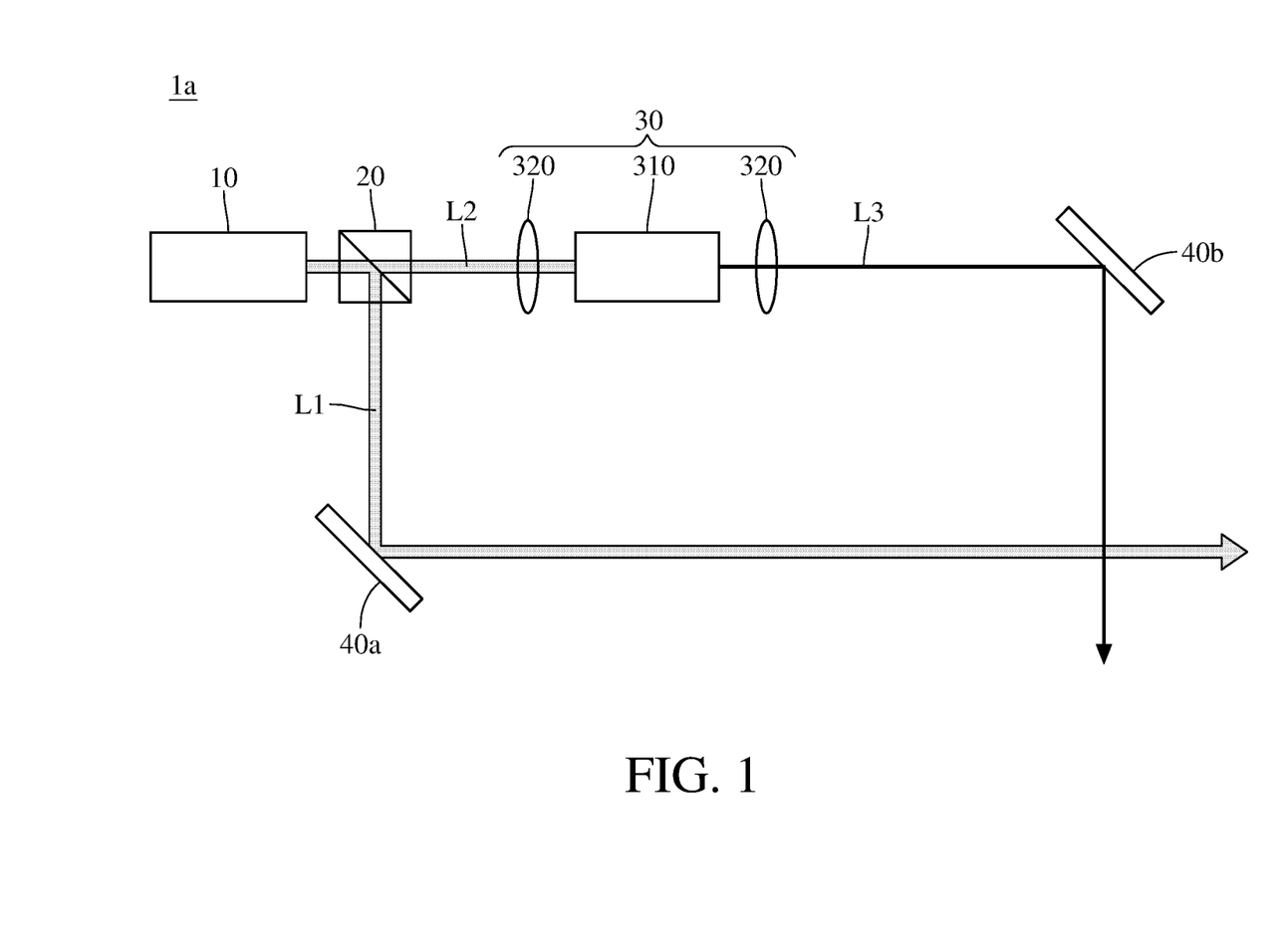
FIG. 1 is a schematic view of a laser processing system according to an embodiment of the present disclosure.

According to one embodiment of the present disclosure, a laser processing system includes a laser source, an optical splitting unit, a frequency conversion unit and at least one optical mixer. Please refer to FIG. 1 showing a schematic view of a laser processing system according to an embodiment of the present disclosure. In this embodiment, the laser processing system 1a includes a laser source 10, an optical splitting unit 20, a frequency conversion unit 30 and multiple optical mixers. It is noted that the present disclosure is not limited to the number of the optical mixers.

The laser source 10, for example but not limited to, is an infrared laser emitter which can generate infrared laser beam with a pulse frequency from 1 Hz to 100 MHz and a pulse width from several picoseconds to several femtoseconds. In this embodiment, the laser source 10 is a monochromatic laser source for emitting laser beam which has a wavelength or wavelength range corresponding to specific color. Take the infrared laser emitter as an example, the laser source 10 can generate a laser beam having a wavelength of 1,000 nanometers (nm), or a laser beam having a wavelength within the range from 700 nm to 1,400 nm.

The optical splitting unit 20, for example but not limited to, is a beam splitter prism disposed on a light emitting side of the laser source 10. In this embodiment, the optical splitting unit 20 is a splitter cube which can divide light emitted by the laser source 10 into a first light L1 and a second light L2. The first light L1 and the second light L2 have the same wavelength range; take the infrared laser emitter as an example, each of the first light L1 and the second light L2 is an infrared laser beam. The term "same wavelength range" herein represents that two light beams (or light rays) have the same wavelength when the laser beam has specific wavelength, or two light beams have the same peak wavelength when the laser beam has specific wavelength range; similarly, the term "different wavelength ranges" hereafter represents that two light beams have different wavelengths when the laser beam has specific wavelength, or two light beams have different peak wavelengths when the laser beam has specific wavelength range.

The frequency conversion unit 30 includes a frequency-doubling crystal 310 and at least one collimating lens 320. The frequency-doubling crystal 310 is a nonlinear optical crystal used for increasing frequency of incident light. The frequency-doubling crystal 310 may be made of lithium niobate ($LiNbO_3$), lithium tantalate ($LiTaO_3$), potassium titanyl phosphate (KTP), potassium dihydrogenphosphate (KDP) or β phase barium borate (BBO). The second light L2 passes through the frequency-doubling crystal 310, and the frequency-doubling crystal 310 convert the second light L2 into a working light L3, and the working light L3 includes a frequency converted light. The frequency converted light and the second light L2 have different wavelength ranges; for example, when the second light L2 having infrared light wavelength range passes through the frequency-doubling crystal 310, the frequency-doubling crystal 310 covert the second light L2 so as to generate a working light L3 including the frequency converted light having green light wavelength range. One collimating lens 320 is disposed on one side of the frequency-doubling crystal 310, or two collimating lenses 320 are respectively disposed on opposite sides of the frequency-doubling crystal 310. The collimating lens 320 is provided for converging the second light L2, and the convergent second light L2 then enters into the frequency-doubling crystal 310; and/or the collimating lens 320 is provided for modulating the working light L3 generated by the frequency-doubling crystal 310 to collimated light.

The frequency conversion unit in the present disclosure is not limited to a configuration including optical crystal and collimating lens. In some embodiments, the frequency conversion unit does not include any collimating lens. In some other embodiments, the frequency conversion unit, without any optical crystal, includes a transparent container in which inert gas is existed.

Each optical mixer includes at least two light path adjustment units 40a, 40b. The light path adjustment unit 40a is disposed on a path of the first light L1, and the light path adjustment unit 40b is disposed on a path of the working light L3. Each of the light path adjustment units 40a, 40b, for example but not limited to, a reflector provided to adjust light path so as to achieve mixture of the first light L1 and the working light L3. The light beam, generated by mixing the first light L1 with the working light L3, strikes an object (for example, metal board) to perform laser processing.

Figure 2:
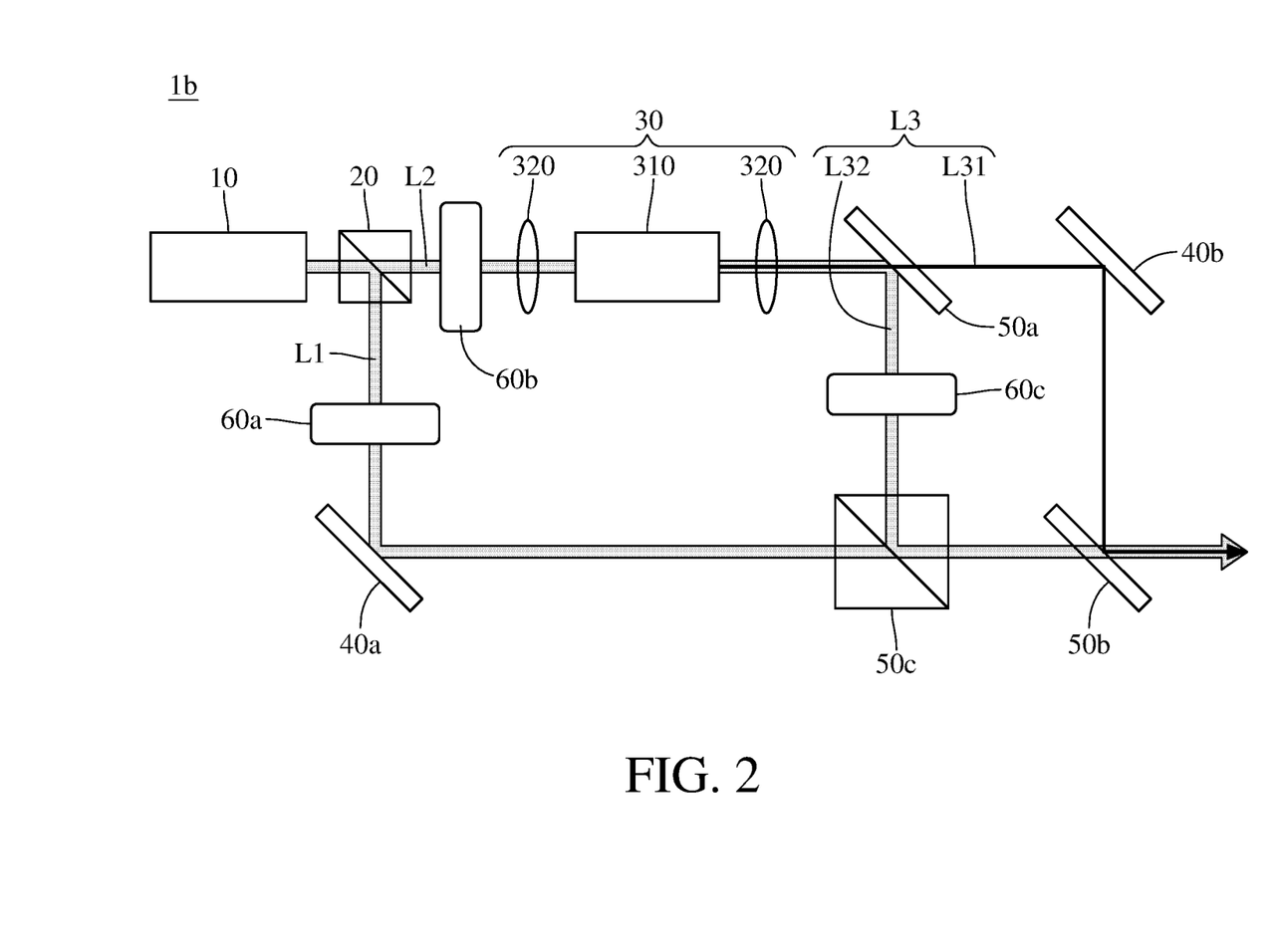
FIG. 2 is a schematic view of a laser processing system according to another embodiment of the present disclosure.

According to the present disclosure, the laser processing system can include a light intensity adjustment unit and an optical filter. Please refer to FIG. 2 showing a schematic view of a laser processing system according to another embodiment of the present disclosure. In this embodiment, the laser processing system 1b includes a laser source 10, an optical splitting unit 20, a frequency conversion unit 30 and multiple optical mixers. Each optical mixer includes a light path adjustment unit 40a, a light path adjustment unit 40b, an optical filter 50a and a light mixing unit 50b. The detail description of the laser source 10, the optical splitting unit 20, the frequency conversion unit 30 and the light path adjustment units 40a, 40b in FIG. 2 can be referred to corresponding elements in FIG. 1 and their description mentioned above, and the detail description is not repeated hereafter.

The optical filter 50a is disposed between the frequency conversion unit 30 and the light path adjustment unit 40b, and the frequency conversion unit 30 is disposed between the optical splitting unit 20 and the optical filter 50a. The optical filter 50a is located at a path of the working light L3 for filtering the working light L3, except the frequency converted light in the working light L3. In detail, in this embodiment, when the second light L2 passes through the frequency conversion unit 30, the frequency of some amount of light is not converted, such that the working light L3 includes the frequency converted light and a frequency non-converted light. The frequency converted light and the second light L2 have different wavelength ranges, and the frequency non-converted light and the second light L2 have the same wavelength range. In this embodiment, the optical filter 50a has high reflectance at wavelength of the frequency non-converted light, and the optical filter 50a has high transmittance at wavelength of the frequency converted light; for example, the optical filter 50a may be a semi-transparent reflector. When the working light L3 reaches the optical filter 50a, the frequency converted light L31 passes through the optical filter 50a so as to travel along original direction, while the frequency non-converted light L32 is deflected by the optical filter 50a so as to travel along different direction. The optical filter 50a deflects the frequency non-converted light L32 so as to allow the frequency non-converted light L32 to travel toward the first light L1, and thus the frequency non-converted light L32 mixes with the first light L1.

The light mixing unit 50b is disposed on a path of the first light L1 and the frequency converted light L31, and the light mixing unit 50b is provided to mix the first light L1 with the frequency converted light L31 which has passed through the optical filter 50a. In detail, the light mixing unit 50b has high transmittance at wavelength of the first light L1, and the light mixing unit 50b has high reflectance at wavelength of the frequency converted light L31; for example, the light mixing unit 50b may be a semi-transparent reflector. The first light L1 can pass through the optical filter 50b so as to travel along original direction, while the frequency converted light L31 is deflected by the optical filter 50a so as to travel along different direction. When the frequency converted light L31, which has been deflected by the light path adjustment unit 40b, reaches the light mixing unit 50b, the frequency converted light L31 is deflected by the light mixing unit 50b so as to travel along the same direction as the first light L1, and thus the frequency converted light L31 mixes with the first light L1. The mixed light finally reaches the object prepared to be processed.

In this embodiment, the laser processing system 1b further includes light intensity adjustment units 60a, 60b and 60c. The optical splitting unit 20 is disposed between the laser source 10 and the light intensity adjustment unit 60a. The light intensity adjustment unit 60a is located at the path of the first light L1, and the light intensity adjustment unit 60a is provided to adjust light intensity of the first light L1. In this embodiment, light intensity adjustment unit 60a is a linear polarizer which can filter light of mixed polarization into light of linear polarization. When the first light L1 passes through the light intensity adjustment unit 60a, the light intensity adjustment unit 60a can be rotated to absorb or split light of unwanted polarization in the first light L1, such that light intensity of the first light L1 reduces after the first light L1 passes through the light intensity adjustment unit 60a. The light intensity adjustment unit 60a can be reversely rotated to make the first light L1 return to its original light intensity.

The light intensity adjustment unit 60b is disposed between the optical splitting unit 20 and the frequency conversion unit 30. The light intensity adjustment unit 60b is located at the path of the second light L2, and the light intensity adjustment unit 60b is provided to adjust light intensity of the second light L2. In this embodiment, the light intensity adjustment unit 60b is a linear polarizer which can filter light of mixed polarization into light of linear polarization. When the second light L2 passes through the light intensity adjustment unit 60b, the light intensity adjustment unit 60b can be rotated to absorb or split light of unwanted polarization in the second light L2, such that light intensity of the second light L2 reduces after the second light L2 passes through the light intensity adjustment unit 60b. The light intensity adjustment unit 60b can be reversely rotated to make the second light L2 return to its original light intensity.

The light intensity adjustment unit 60c is located at the path of the frequency non-converted light L32, and the light intensity adjustment unit 60c is provided to adjust light intensity of the frequency non-converted light L32. The optical filter 50a is located between the frequency conversion unit 30 and the light intensity adjustment unit 60c. In this embodiment, the light intensity adjustment unit 60c is a linear polarizer which can filter light of mixed polarization into light of linear polarization. When the frequency non-converted light L32, which is deflected by the optical filter 50a, travels toward the first light L1, the frequency non-converted light L32 passes through the light intensity adjustment unit 60c, and the light intensity adjustment unit 60c can be rotated to absorb or split light of unwanted polarization in the frequency non-converted light L32, such that light intensity of the frequency non-converted light L32 reduces after the frequency non-converted light L32 passes through the light intensity adjustment unit 60c. The light intensity adjustment unit 60c can be reversely rotated to make the frequency non-converted light L32 return to its original light intensity.

In this embodiment, the optical mixers of the laser processing system 1b further include a light mixing unit 50c located at a position where both the frequency non-converted light L32 and the first light L1 travel. The light mixing unit 50c is disposed between the light path adjustment unit 40a and the light mixing unit 50b. In this embodiment, the light mixing unit 50c can be a beam combining prism (beam combiner). The first light L1 can pass through the light mixing unit 50c so as to travel along original direction. When the frequency non-converted light L32, which is deflected by the optical filter 50a, reaches the light mixing unit 50c, the frequency non-converted light L32 is deflected by the light mixing unit 50c so as to mix with the first light L1 and travel along the same direction as the first light L1 toward the light mixing unit 50b. Moreover, in this embodiment, the light mixing unit 50b can include an optical chopper (not shown in the drawings) at one side of the light mixing unit 50c, and the optical chopper can be used to prevent light leak in the laser processing system 1b.

Figure 3:
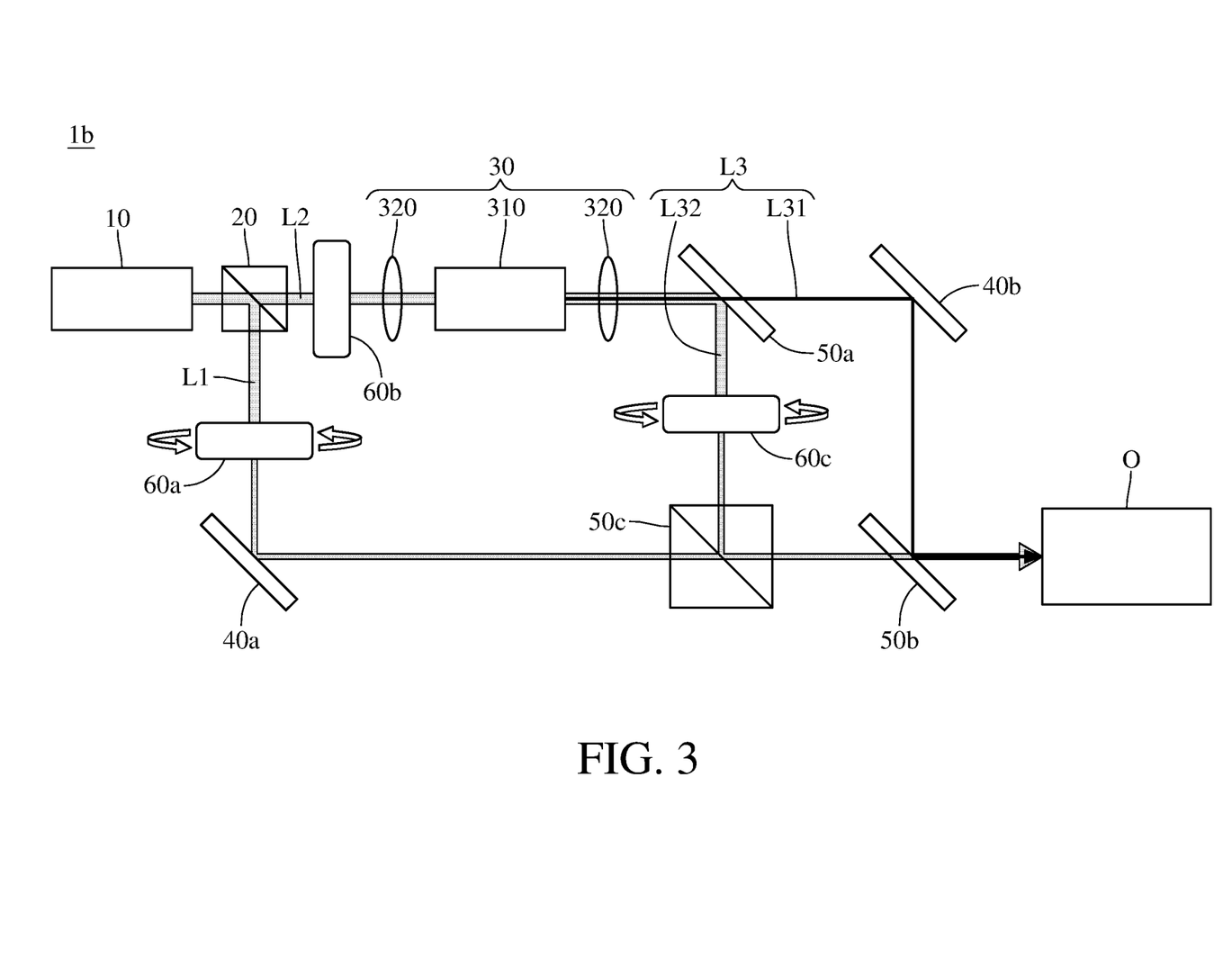
FIG. 3 is a schematic view showing that an object is initially processed by the laser processing system in FIG. 2.
Figure 4:
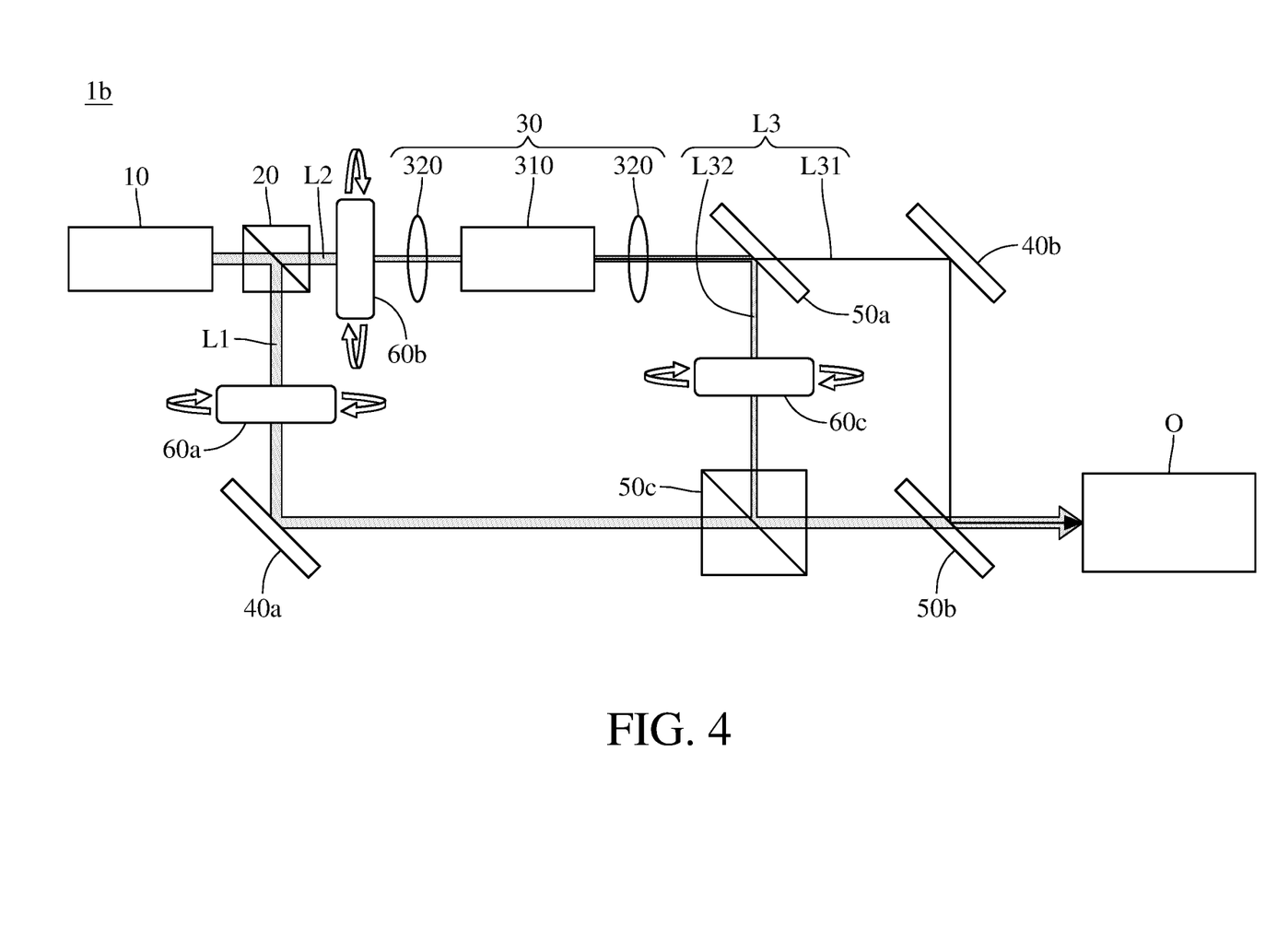
FIG. 4 is a schematic view showing that the object in FIG. 3 is processed to be at liquid state by the laser processing system.

The following describes a method of processing an object O by the laser processing system 1b. Please refer to FIG. 3 and FIG. 4. FIG. 3 is a schematic view showing that an object is initially processed by the laser processing system in FIG. 2, and FIG. 4 is a schematic view showing that the object in FIG. 3 is processed to be at liquid state by the laser processing system. The object O may be a glass plate or a metal plate in this embodiment, and the laser processing system 1b can be used to cut the object O or transfer a pattern to the object O. The object O is at a solid state before processing or at the beginning of processing, and the solid object O has high energy absorption efficiency for light having short wavelength.

The light intensity of the first light L1 and/or that of the frequency non-converted light L32 (light with long wavelength) can be reduced by at least one of the light intensity adjustment units 60a and 60c, or even completely filter out the first light L1 and the frequency non-converted light L32. Furthermore, the light intensity of the second light L2 can be enhanced by the light intensity adjustment unit 60b, such that the frequency converted light L31 (light with short wavelength) generated by the frequency conversion unit 30 can have high light intensity. As shown in FIG. 3, by the rotation of the light intensity adjustment unit 60a and/or the light intensity adjustment unit 60c, some amount of light in the first light L1 and/or some amount of light in the frequency non-converted light L32 cannot pass through the light intensity adjustment unit, and thus the first light L1 reaching the light mixing unit 50b has low light intensity or almost no light intensity. Therefore, only a small amount of light or almost no light with long wavelength exists after the first light L1 and the frequency converted light L31 mix together. The laser processing system 1b can use light with short wavelength (frequency converted light L31) to strike the object O, thereby obtaining better processing efficiency.

After the object O has been processed by the frequency converted light L31 or mixture of the frequency converted light L31 and the first light L1 for a while, at least a portion of the object O is from the solid state to the liquid state, and the liquid object O has high energy absorption efficiency for light having long wavelength. The light intensity of the first light L1 (light with long wavelength) can be enhanced by the light intensity adjustment unit 60a; moreover, the light intensity of the second light L2 (light with short wavelength) can be reduced by the light intensity adjustment unit 60b. Thus, the frequency converted light L31 generated by the frequency conversion unit 30 can have low light intensity or almost no light intensity. As shown in FIG. 4, the first light L1 returns to its original light intensity by the reverse rotation of the light intensity adjustment unit 60a, and the frequency converted light L31 generated by the frequency conversion unit 30 has low light intensity by the rotation of the light intensity adjustment unit 60b. Therefore, only a small amount of light or almost no light with short wavelength exists after the first light L1 and the frequency converted light L31 mix together. The laser processing system 1b can use light with long wavelength (first light L1) to strike the liquid object O, thereby obtaining better processing efficiency.

In this embodiment, the laser processing system 1b includes the optical splitting unit 20 and the frequency conversion unit 30. The optical splitting unit 20 can divide a monochromatic laser beam emitted by the laser source 10 into two laser beams. One of the two laser beams passes through the frequency conversion unit 30 so as to obtain a frequency converted laser beam which have different wavelength from the monochromatic laser beam. The other laser beam can mix with the frequency converted laser beam so as to output a terminal laser beam including several light with different wavelengths. Moreover, the laser processing system 1b includes the light intensity adjustment units 60a, 60b provided to enhance or reduce light intensity of the frequency non-converted laser beam (first light L1) and that of the frequency converted laser beam (frequency converted light L31). The laser processing system 1b can adjust wavelength of the terminal laser beam used for processing object according to the material and phase state of said object, or adjust the ratio of light with short wavelength to light with long wavelength light contained in the terminal laser beam. Therefore, the wavelength of the working laser beam can be optimized according to the material and phase state of said object, such that the laser processing system 1b is applicable to various types of object, and it is favorable for maintaining efficient energy absorption during processing of the object.

Furthermore, in this embodiment, the laser processing system 1b includes the optical filter 50a and the light intensity adjustment unit 60c. Since the second light L2 may not be completely converted into frequency converted light when passing through the frequency conversion unit 30, the working light L3 generated by the frequency conversion unit 30 may include frequency converted light L31 and frequency non-converted light L32 (some amount of light in the second light L2 that is not converted). The frequency non-converted light L32 can mix with the first light L1 by the optical filter 50a and the light intensity adjustment unit 60c. Therefore, the laser processing system 1b prevents loss of the frequency non-converted light L32, and the frequency non-converted light can become some amount of light in the terminal laser beam.

According to the present disclosure, with an optical path design including optical splitting unit and frequency conversion unit, the laser processing system only needs a monochromatic laser source to be applicable to process different types of object. Furthermore, the light intensity adjustment unit can adjust wavelength of the terminal laser beam used for processing object according to the material and phase state of said object. Therefore, the wavelength of the working laser beam can be optimized according to the material and phase state of said object, such that the laser processing system 1b is applicable to various types of object, and it is favorable for constantly maintaining efficient energy absorption during processing of the object.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A laser processing system, comprising:
   a laser source;
   an optical splitting unit provided to divide light emitted by the laser source into a first light and a second light, with the first light and the second light having the same wavelength range;
   a frequency conversion unit provided to convert the second light into a working light, wherein the working light comprises a frequency converted light, the frequency converted light and the second light have different wavelength ranges;
   a light intensity adjustment unit disposed between the optical splitting unit, which is closer to the laser source than the frequency conversion unit, and the frequency conversion unit, and the light intensity adjustment unit is provided to adjust light intensity of the second light; and
   at least one optical mixer provided to mix the first light with the frequency converted light.

2. The laser processing system according to claim 1, wherein the laser source is a monochromatic laser source.

3. The laser processing system according to claim 1, further comprising another light intensity adjustment unit, wherein the optical splitting unit is disposed between the laser source and the another light intensity adjustment unit, and the another light intensity adjustment unit is provided to adjust light intensity of the first light.

4. The laser processing system according to claim 1, wherein the at least one optical mixer comprises an optical filter with the frequency converted light able to pass through, the working light further comprises a frequency non-converted light, the frequency non-converted light and the second light have the same wavelength range, the frequency conversion unit is disposed between the optical splitting unit and the optical filter, and the optical filter is provided to deflect the frequency non-converted light so as to allow the frequency non-converted light to travel toward the first light.

5. The laser processing system according to claim 4, wherein the at least one optical mixer further comprises a light mixing unit provided to mix the frequency converted light, which passes through the optical filter, with the first light.

6. The laser processing system according to claim 5, wherein the optical filter has high reflectance at wavelength of the frequency non-converted light and high transmittance at wavelength of the frequency converted light, the light mixing unit has high transmittance at wavelength of the first light and high reflectance at wavelength of the frequency converted light.

7. The laser processing system according to claim 5, wherein the at least one optical mixer further comprises a light path adjustment unit disposed between the optical filter and the light mixing unit, and the light path adjustment unit is provided to deflect the frequency converted light so as to allow the frequency converted light to travel toward the light mixing unit.

8. The laser processing system according to claim 4, wherein the at least one optical mixer further comprises a light mixing unit provided to mix the frequency non-converted light which has been deflected by the optical filter, with the first light.

9. The laser processing system according to claim 4, wherein the at least one optical mixer further comprises another light intensity adjustment unit provided to adjust light intensity of the frequency non-converted light which has been deflected by the optical filter.

10. A laser processing system, comprising:
    a laser source;
    an optical splitting unit provided to divide light emitted by the laser source into a first light and a second light, with the first light and the second light having the same wavelength range;
    a frequency conversion unit provided to convert the second light into a working light, wherein the working light comprises a frequency converted light, the frequency converted light and the second light have different wavelength ranges;
    a first light intensity adjustment unit provided to adjust light intensity of the first light, wherein the optical splitting unit is disposed between the laser source and the first light intensity adjustment unit; and
    a second light intensity adjustment unit provided to adjust light intensity of the second light, wherein the second light intensity adjustment unit is disposed between the optical splitting unit, which is closer to the laser source than the frequency conversion unit, and the frequency conversion unit.

11. The laser processing system according to claim 10, wherein the laser source is a monochromatic laser source.

12. The laser processing system according to claim 10, further comprising an optical filter with the frequency converted light able to pass through, the working light further comprises a frequency non-converted light, the frequency non-converted light and the second light have the same wavelength range, the frequency conversion unit is disposed between the optical splitting unit and the optical filter, the optical filter is provided to deflect the frequency non-converted light so as to allow the frequency non-converted light to travel toward the first light.

13. The laser processing system according to claim 12, further comprising a third light intensity adjustment unit provided to adjust light intensity of the frequency non-converted light which has been deflected by the optical filter.

14. The laser processing system according to claim 10, wherein each of the first light intensity adjustment unit and the second light intensity adjustment unit is a linear polarizer.

* * * * *